UNITED STATES PATENT OFFICE.

ARTHUR F. WENDT, OF NEW YORK, N. Y.

PROCESS OF SEPARATING METALS FROM FRANKLINITE ORES.

SPECIFICATION forming part of Letters Patent No. 297,480, dated April 22, 1884.

Application filed November 21, 1883. (Specimens.)

*To all whom it may concern:*

Be it known that I, ARTHUR F. WENDT, of the city, county, and State of New York, have invented certain new and useful Improvements in Processes of Separating Metals from Franklinite Ores, of which the following is a specification.

Franklinite ores are found in large quantities in the State of New Jersey. They are formed of an intimate mechanical mixture of the minerals franklinite, willemite, zincite, calcite, (or limestone,) rhodonite, and tephroite. The quantity of each mineral contained in the ore as mined diminishes in the order in which the minerals are stated—to wit, about forty-five to fifty per cent., in weight, of franklinite, twenty to thirty per cent. of willemite, and smaller quantities of the remaining minerals. The chemical construction of the ore is as follows: silica, nine to twelve per cent.; oxide of zinc, twenty to thirty per cent.; magnetic oxide of iron, twenty-five to thirty-five per cent.; oxide of manganese, ten to twenty per cent.

The common method of treating franklinite ore heretofore in use is to crush the ore, mix it with a certain proportion of fine coal, and sometimes with limestone flux, and burning this mixture on perforated iron plates, through which air is blown, in a furnace known as the "Wetherill furnace." The zinc is reduced, volatilized, burned into oxide, blown into cotton bags, and collected therein as oxide of zinc, which is used for white paint.

The Wetherill process is applied to crude ore as shipped from the mines without any selection of the ore, excepting an arbitrary division by hand at the oxide-works according to the color of the ore, for the purpose of manufacturing different qualities and colors of zinc paint. The Wetherill furnace treatment extracts about three-fourths of the oxide of zinc in the ore charged. The material remaining in the Wetherill furnaces after treatment (the so-called "residuum") contains the remaining one-fourth of the zinc oxide, the silica, iron, and manganese originally found in the ore, and the lime of any limestone flux that may have been added, and also the ash of the coal used in the Wetherill process. This residuum is treated in a blast-furnace for the recovery of the iron and manganese in the shape of spiegeleisen. Incidentally, the oxide of zinc remaining in the residuum is reduced, volatilized, carried along by the ascending gases, and caught as oxide and "blue-powder" in condensers attached to the blast-furnace.

Partially successful attempts have been made to work franklinite ores for the manufacture of spelter. The method in use is to select franklinite ore rich in zinc by hand, mix this with from one to two times its own weight of calamine, and treat in a common spelter-furnace. No attempt, however, is made to free the ore of franklinite or manganese minerals except as is incidental to the selection of franklinite ore richest in zinc. This process can only be carried out on a limited scale, and is expensive, owing to the high cost of calamine ores serving as a mixture, and owing to the rapid destruction of the retorts in which the operation is carried out, due to the presence of large quantities of iron and manganese in the franklinite ores operated upon in said process.

My invention has for its object the separation of the minerals composing franklinite ore, so that a practically pure silicate of zinc or willemite is obtained, which is then subjected to further treatment for the production of spelter, while the remaining minerals are subjected, first, to the Wetherill process, and the residuum resulting therefrom to the blast-furnace process, producing thereby a higher grade of spiegeleisen than heretofore; and for this purpose the invention consists, first, in assorting franklinite ores properly broken into uniform pieces according to the color, texture, and fracture in such a manner that a mixture of silicate of zinc or willemite and franklinite only forms one class of ore and the silicates of manganese and the other remaining minerals a second class of ores, then crushing the so assorted franklinite and willemite, and separating them mechanically according to their different specific gravities, and then working up the willemite for spelter and the franklinite alone or in admixture for zinc oxide and spiegeleisen.

In carrying out my invention I first crush the crude franklinite ore by any approved crushing-machine to pieces or lumps of uniform size—say of from four to six inches in diameter. These lumps are slowly conducted over endless belts or picking-tables, and the ores assorted by hand by throwing out any pieces containing only the willemite and franklinite according to their appearance, color, or fracture. The characteristic of pure willemite is its yellowish or greenish or reddish translucent color and fracture, of franklinite its slimy black color, and of the silicates of manganese their opaque gray or pink color. The so assorted mixture of willemite and franklinite ores is now crushed to about one-eighth mesh—that is, so that each particle will pass through a hole of one-eighth of an inch square—and then separated by suitable jigs, preferably by the jig for which Letters Patent have been granted to me heretofore, numbered 247,281, and dated September 20, 1881. The separation of the willemite and franklinite is thereby obtained, as these minerals have different specific gravities. The thus separated willemite is treated, alone or in admixture with other ores, in a common spelter-furnace for the manufacture of spelter, while the separated franklinite is treated, alone or mixed with other ores, by the Wetherill process, before mentioned. The residuum from the separated franklinite is lower in silica and higher in iron and manganese, and hence makes a cheaper and higher grade of spiegeleisen. The franklinite ore as mined can thus be worked to better advantage not only for the manufacture of spelter, but also for producing a higher grade of spiegeleisen.

Having thus described my invention, I claim as new and desire to secure by Letters Patent—

The process herein described of reducing franklinite ores, which consists in selecting that portion of the ore containing practically only franklinite and willemite, separating these minerals according to their specific gravities, as described, smelting the willemite for spelter and reducing the franklinite by the Wetherill process for oxide of zinc, and finally smelting the residuum for spiegeleisen, substantially as set forth.

In testimony that I claim the foregoing as my invention I have signed my name in presence of two subscribing witnesses.

ARTHUR F. WENDT.

Witnesses:
PAUL GOEPEL,
SIDNEY MANN.